United States Patent [19]

Bell et al.

[11] 3,873,578
[45] Mar. 25, 1975

[54] OLEFIN EPOXIDATION

[75] Inventors: Charles S. Bell, Houston, Tex.;
Harald P. Wulff, Ludwigshafen, Germany

[73] Assignee: Shell Oil Company, Houston, Tex.

[22] Filed: Dec. 21, 1973

[21] Appl. No.: 427,202

Related U.S. Application Data

[63] Continuation-in-part of Ser. No. 153,834, June 16, 1971, abandoned.

[52] U.S. Cl. .......................................... 260/348.5 L
[51] Int. Cl. ............................................... C07d 1/08
[58] Field of Search ............................. 260/348.5 L

[56] References Cited
UNITED STATES PATENTS
3,332,965  7/1967  Fukui et al. .................. 260/348.5 R FOREIGN PATENTS OR APPLICATIONS
748,316  10/1970  Belgium Primary Examiner—Norma S. Milestone

[57] ABSTRACT

Olefin oxides are produced by the reaction of an organic hydroperoxide and an olefinically unsaturated compound in the presence of a polyorganotitanosiloxane polymer as catalyst.

14 Claims, No Drawings

OLEFIN EPOXIDATION

RELATED APPLICATION

This application is a continuation-in-part of Ser. No. 153,834, filed June 16, 1971 and now abandoned.

DESCRIPTION OF THE PRIOR ART

The epoxidation of olefins with organic hydroperoxides in the presence of titanium-containing catalyst is well known. Generally, however, the only effective titanium-containing epoxidation catalysts are heterogeneous catalysts such as a chemical combination of titania-silica disclosed in Ser. No. 812,920 of Wulff et al., common assignee, filed Apr. 2, 1969, now abandoned, and in corresponding Belgian patent No. 748,316; and titanium silicides disclosed in copending Ser. No. 50,311 of Bell et al., common assignee, filed June 26, 1970, now U.S. Pat. No. 3,702,855. Although homogeneous titanium-containing epoxidation catalysts are known, for example, those disclosed in U.S. Pat. No. 3,351,635, the selectivities to olefin oxide obtained with such homogeneous titanium catalysts are significantly lower than those obtained with said heterogeneous titanium catalysts.

SUMMARY OF THE INVENTION

It has now been found that improved epoxidation of olefinically unsaturated compounds with organic hydroperoxides is effected with polyorganotitanosiloxane polymers as catalyst. The polymer is a homogeneous catalyst which effects the epoxidation of olefins with organic hydroperoxides in high hydroperoxide conversion and olefin oxide selectivity.

DESCRIPTION OF PREFERRED EMBODIMENTS

Polyorganotitanosiloxane Polymer Catalyst

Polyorganotitanosiloxanes are thermally stable polymers which contain atoms of silicon, titanium and oxygen in the molecular chain. The preparation of such polymers is well known in the art. Exemplary review references include: (1) K.A. Andrianov USPEKHI KHIMI 27 (11), 1257–1303 (1958); (2) K.A. Andrianov, USPEKHI KHIMI, 26 (8), 894–922 (1957); and (3) A. Frazer, "High Temperature Resistant Polymers" pp 228–267, Wiley, 1968.

The structures of polyorganotitanosiloxane polymers are extremely complex and difficult to describe without the use of complex formulas. By way of illustration a simple polyorganotitanosiloxane polymer is represented by the formula:

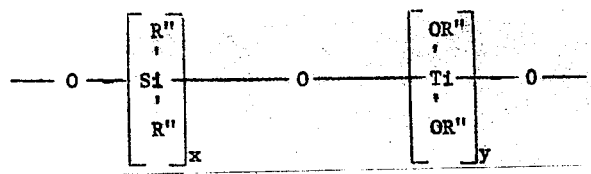

wherein $x$ and $y$ are whole integers and $R''$ groups are the same or different organo, i.e., hydrocarbyl or substituted-hydrocarbyl, groups.

However, despite the structural complexity of polyorganotitanosiloxane polymers, the preparation of such polymers is extremely simple and consists of the hydrolysis of a silane and an ester of orthotitanic acid in selected molar ratios. In view of the foregoing, the polyorganotitanosiloxane polymers employed in the epoxidation process are best described in terms of their method of production.

The esters of orthotitanic acid employed for preparing the polyorganotitanosiloxane polymer catalysts are represented by the formula $Ti(OR)_4$ wherein R is an alkyl group of 1 to 6 carbon atoms. Illustrative orthotitanoic esters therefore include the tetramethoxytitanate, tetraisopropyltitanate and tetra-n-butyltitanate.

The silane reactants employed for preparing the polyorganotitanosiloxane polymer catalysts are represented by the formula $(R')_n Si(X)_m$ wherein $R'$ is R or a mononuclear aryl group of 6 to 10 carbon atoms, e.g. phenyl, tolyl or xylyl; X is chlorine, bromine, phenoxy, or alkoxy of 1 to 6 carbon atoms; $n$ is a whole number from 1 to 2; $m$ is a whole number from 2 to 3 inclusive; and the sum of $n+m$ is four.

Suitable silane reactants therefore include dihalosilanes such as dimethyldichlorosilane, diethyldibromosilane, dipropyldichlorosilane, dihexyldibromosilane, diphenyldichlorosilanes and ditolyldibromosilane; trihalosilanes such as methyltrichlorosilane, butyltribromosilane, phenyltrichlorosilane and xylyltribromosilane; alkoxysilanes such as dimethyldimethoxysilane, diphenyldipropoxysilane and methyltributoxysilane; and phenoxysilanes such as diethyldiphenoxysilane and diphenyldiphenoxysilane. Preferred silane reactants are halosilanes, particularly dialkyldichlorosilanes or dialkyldibromosilanes.

The hydrolysis of the silane and orthotitanic acid ester is conducted in aqueous alkaline solution, e.g., an aqueous alkali metal hydroxide solution or alkali metal carbonate solution. The amount of aqueous alkaline solution is not critical provided sufficient base is present to hydrolyze the halo, phenoxy, or alkoxy groups of the silane reactant. Generally, a molar ratio of base to halo, phenoxy or alkoxy groups of the silane of at least 1:1 is satisfactory, although molar ratios of base to halo, phenoxy or alkoxy groups of 2:1 to 6:1 are preferred.

The hydrolysis reaction mixture preferably additionally contains an inert organic co-solvent in which polyorganotitanosiloxane polymer is soluble, i.e., an extractive solvent for the polyorganotitanosiloxane polymer. Suitable organic solvents include alkanes of 6 to 15 carbon atoms, including cycloalkanes, such as hexane and cyclohexane and aromatic solvents such as benzene and toluene. Suitable mixtures of water and organic co-solvent vary from about 20 to 80% by volume of organic co-solvent and from 80% to 20% by volume of water.

The temperature of the hydrolysis reaction depends in part upon the reactivity of the silane reactant. Generally, temperatures from about 25°C to 200°C are satisfactory.

The amount of silane and orthotitanic acid ester employed in the hydrolysis reaction depends in part upon the Si/Ti ratio desired in the polyorganotitanosiloxane polymer. Polyorganotitanosiloxane polymers which are useful as catalyst in the epoxidation process are generally produced by hydrolyzing the silane and orthotitanic ester in molar ratios of about 15:1 to 1:1, preferably in molar ratios of 10:1 to 5:1.

The polyorganotitanosiloxane polymer catalysts can be prepared by cohydrolyzing a single silane or a mixture of different halosilanes with a single orthotitanic acid ester or a mixture of different orthotitanic acid esters. Alternatively, the silane reactant (or mixture of silanes) is hydrolyzed to produce a polysiloxane polymer and subsequently the orthotitanic acid ester (for a mixture of esters) is hydrolyzed with the preformed polysiloxane polymer to produce the polyorganotitanosiloxane polymer. However, in any combination of reactants or sequence of hydrolysis, the molar ratios of the total silanes and orthotitanic acid esters are within the molar ratios defined above.

The epoxidation process is characterized by the requirement for only catalytic quantities of the polyorganotitanosiloxane polymer. However, amounts of polyorganotitanosiloxane based on organic hydroperoxide from about 0.001% by weight to 100% by weight can be employed, although amounts of polyorganotitanosiloxane from about 0.01% to about 10% by weight on the same basis are preferred.

The Olefinic Reactant

The process of the invention is generally applicable to the epoxidation of any organic compound having at least one aliphatic, olefinically unsaturated carbon-carbon double bond, and generally of from 2 to 60 carbon atoms, but more suitably of from 3 to 30 carbon atoms. The olefinic reactant is an acyclic, a monocyclic, a bicyclic or a polycyclic olefin and is a monoolefin, diolefin, or polyolefin. The olefinic linkages of diolefins and polyolefins are either conjugated or nonconjugated. The olefinic reactant preferably is a hydrocarbon, but it can be a substituted hydrocarbon additionally containing relatively stable functional groups incorporating atoms such as oxygen, halogen and nitrogen.

Preferred as olefinic reactants are (a) aliphatic hydrocarbon monoolefins, including linear terminal olefins, of from 3 to 30 carbon atoms, more preferably from 3 to 20 carbon atoms, such as propylene, isobutylene, hexene-3, octene-1, and decene-1; (b) monocyclic monoolefins of from 5 to 20 carbon atoms, such as cyclopentene, cyclohexene, methylenecyclohexene, and allyl benzene; and (c) oxygen-containing substituted hydrocarbon olefins of from 3 to 30 carbon atoms such as allyl and crotyl alcohols, diallyl and phenyl allyl ether, ethyl methacrylate, allyl acetate, and crotonaldehyde.

The Organic Hydroperoxide

The process of the invention is broadly applicable to the use of any organic compound having at least one hydroperoxide moiety, but free of functional groups which are normally reactive with hydroperoxide. One suitable class of organic hydroperoxides having from 3 to 20 carbon atoms is represented by formula I.

R"OOH        (1)

wherein R" is a hydrocarbyl group or a substituted hydrocarbyl group additionally containing halogens of atomic number 7 to 53 inclusive, e.g., fluorine, chlorine, bromine or iodine, or oxygen incorporated into functional groups such as hydroxy, hydrocarbyloxy, hydrocarboyl, hydrocarbyloxycarbonyl, hydrocarboyloxy, and the like.

Hydrocarbon hydroperoxides of from 3 to 20 carbon atoms are preferred for use in the present invention. Particularly preferred hydrocarbon hydroperoxides are secondary and tertiary hydroperoxides of up to 10 carbon atoms, especially tertiary alkyl hydroperoxides, such as tertiary butyl hydroperoxide and tertiary amyl hydroperoxide, and secondary and tertiary aralkyl hydroperoxides wherein the hydroperoxy group is on a carbon atom attached directly to an aromatic ring, such as alpha-methylbenzyl hydroperoxide, cumene hydroperoxide, and tetralin hydroperoxide.

The organic hydroperoxide may be prepared by passing an oxygen-containing gas through the corresponding hydrocarbon until at least a portion of said hydrocarbon is converted to the hydroperoxide. Organic hydroperoxide so produced may be supplied to the epoxidation reaction as a dilute or concentrated solution, generally 5 to 70% by weight in its hydrocarbon precursor, and in a purified or unpurified form.

In the epoxidation reaction, the molar ratio of olefinic reactant to hydroperoxide can vary over a wide range and a molar excess of either the olefinic reactant or hydroperoxide of up to as high as 100:1 can be used. In general, molar ratios of olefinic reactant to hydroperoxide in the range from about 50:1 to about 1:10 are satisfactory, although it is preferred to employ molar ratios of olefinic reactant to hydroperoxide of about 20:1 to about 1:1.

The Reaction Conditions

The epoxidation process of the invention is conducted in the liquid phase in solvents or diluents which are liquid at reaction temperature and pressure and are substantially inert to the reactants and the products produced therefrom.

Illustrative suitable solvents are oxygen-containing solvents such as fully esterified polyacyl esters of polyhydroxyalkanes, e.g., glycerol triacetate, tetraacyl esters of erythritol and diethylene glycol diacetate; monoesters such as butyl propionate and phenyl acetate; ketones such as acetone, diethyl ketone and methyl isobutyl ketone; ethers such as dibutyl ether, dioxane and tetrahydrofuran; as well as nitrogen-containing solvents such as nitriles, e.g., acetonitrile and propionitrile, and dialkylamides such as dimethylformamide.

Preferred solvents are mononuclear aromatics such as benzene, toluene, ethylbenzene, chlorobenzene, o-dichlorobenzene; and alkanes such as octane, nonane, decane, and dodecane.

Particularly preferred solvents are the hydrocarbons employed for producing the hydroperoxide reactant, e.g., alkylbenzenes such as ethylbenzene, and isopropylbenzene and tertiary alkanes (an alkane containing a carbon atom attached to 3 other carbon atoms) such as isobutane and isohexane.

In one mode of practicing the epoxidation process, when the olefinic reactant is liquid at reaction conditions, a portion of the olefinic reactant may serve as the reaction solvent and no added solvent is needed. In most instances, however, added solvent is used and amounts up to about 20 moles of solvent per mole of organic hydroperoxide are satisfactory. The process is preferably conducted in an inert reaction environment so that the presence of reactive materials such as water is desirably avoided. Suitable reactions are therefore substantially anhydrous.

The precise method of conducting the epoxidation process is not critical. In one modification, the olefin, the hydroperoxide, the catalyst and any solvent which is employed are changed to an autoclave or similar reactor and maintained at reaction conditions for the desired reaction period. In another modification, one reactant is added to the remaining reaction mixture components in increments, as by adding the hydrocarbon hydroperoxide to a mixture of the alkene reatant, the catalyst and the solvent maintained at reaction temperatures and pressure. In yet another modification, epoxidation is effected in a continuous manner as by passing the olefin and the hydroperoxide in liquid phase solution through a reactor in which the catalyst is maintained. In a suitable mode for continuous reaction, the reactants, diluent and catalyst are added continually as individual streams or as a mixture to an agitated reaction vessel or a pipe loop reactor maintained at reaction conditions, and a portion of the reaction mixture is continually withdrawn for recovery of reaction product. By any modification, the epoxidation process is conducted at moderate temperatures and pressures. Suitable reaction temperatures are in the range from about 0°C to about 200°C, but preferably from 25°C to 200°C. The reaction is conducted at or above atmospheric pressure. The precise pressure is not critical so long as it is sufficient to maintain the reaction mixture substantially in a non-gaseous phase. Typical pressures vary from about 1 atmosphere to about 100 atmospheres.

At the conclusion of the reaction, the product mixture is separated and the products are recovered by conventional methods such as fractional distillation, selective extraction, filtration and the like. The reaction solvent, the catalyst and any unreacted olefin or hydroperoxide are recycled for further utilization.

The Products

According to the process of the invention, the olefinic reactant is epoxidized to the corresponding olefin oxide. By way of illustration, propylene oxide is produced from propylene.

The olefin oxide products are materials of established utility and many are chemicals of commerce. For example, propylene oxide, an illustrative olefin oxide which is readily prepared by the process of the invention, is formulated into useful polymers by polymerization or copolymerization as disclosed by U.S. Pat. No. 2,815,343; 2,871,219 and 2,987,489.

According to the process of the invention, the organic hydroperoxide is converted to the corresponding alcohol. The alcohol can be recovered as a co-product of the process or reconverted to the hydroperoxide by procedures such as dehydration to olefin, hydrogenation of the olefin and oxidation to hydroperoxide, or by hydrogenolysis to hydrocarbon followed by oxidation to hydroperoxide.

ILLUSTRATIVE EMBODIMENT 1

To a stirred mixture of 59.9g of sodium hydroxide in 605 ml of water and 1290 ml of toluene was added dropwise a mixture of 55g dimethyldichlorosilane, 45.1g of phenyltrichlorosilane and 22g of tetrabutoxytitanate. The mildly exothermic reaction was maintained at 20°-22°C by water cooling. The toluene layer of the reaction mixture was separated, dried over magnesium sulfate, filtered and evaporated to give 45.2g of polyorganotitanosiloxane as a viscous, pale yellow liquid having a molecular weight of about 1280.

Analysis: 42.9%wC; 6.2%wH; 26.1%wSi; 1.2%wTi; and 23.6%wO (by diff.)

The above-described procedure is substantially identical to that reported by K. A. Andrianov, *Otdei Khim Nauk* 798 (1956) for the preparation of a polyorganotitanosiloxane by the cohydrolysis of dimethyldichlorosilane and phenyltrichlorosilane with tetrabutoxytitanote.

ILLUSTRATIVE EMBODIMENT 2

To a stirred mixture of 158g of sodium carbonate in 600 ml of water and 1300 ml of toluene was added dropwise a mixture of 55g dimethyldichlorodisilane and 45.1g of phenyltrichlorosilane. The mildly exothermic reaction was maintained at 20°-22°C by water cooling. The toluene layer of the reaction mixture was separated, washed with water, and then dried over magnesium sulfate. It was then filtered and the filtrate recharged to a stirred reaction vessel. A solution of 22g of titaniumtetrabutyltitanate in 50 ml of toluene was added dropwise to the stirred mixture at 20°C. The reaction mixture was then heated at 80°-85°C for 5 hours, cooled, and evaporated under vacuum to give 63.43g of polyorganotitanosiloxane as a viscous, pale yellow liquid having a molecular weight of about 492 ± 5.

Analysis: 43.4%wC; 6.0%wH; 24.5%wSi; 5.3%wTi; and 20.8% wO (by diff.)

The above-described procedure is substantially identical to that reported by K. A. Andrianov, loc. cit., method B, for the preparation of polyorganotitanosiloxane.

ILLUSTRATIVE EMBODIMENT 3

The epoxidation of 1-octene with ethylbenzene hydroperoxide was conducted with the polyorganotitanosiloxane polymer of Embodiment 1 as catalyst. The epoxidation was conducted by charging 1g of the polymer, 29.2g of 1-octane and 15 m of ethylbenzene hydroperoxide (35%w in ethylbenzene) to a 100 ml glass reactor and maintaining the reaction mixture under reflux (126°C) for 2.1 hours. The titanium content of the reaction mixture was 0.02%w. A 99.7% conversion of hydroperoxide and a 95.4% selectivity to 1-octene oxide based on converted hydroperoxide were obtained.

ILLUSTRATIVE EMBODIMENT 4

The epoxidation run of Illustrative Embodiment 3 was repeated with the same amount of reactants, but conducting the reaction for 3 hours at a temperature of 110°C. A 99.9% conversion of hydroperoxide and a 90.4% selectivity to 1-octene oxide based on converted hydroperoxide were obtained.

ILLUSTRATIVE EMBODIMENT 5

In two additional runs carried out at the conditions of Illustrative Embodiment 4, but with the added presence of 2.1 weight percent nonane, the observed coonversion of hydroperoxide in a run carried out for one hour was 94.9%, with a selectivity to 1-octene oxide of of 91.8% and the conversion in a run carried out for 2 ½ hours was 99.6%, with a selectivity to 1-octene oxide of 94.1%.

ILLUSTRATIVE EMBODIMENT 6

The epoxidation of 1-octene with t-butyl hydroperoxide was conducted with the polyorganotitanosiloxane polymer prepared in Illustrative Embodiment 1 as catalyst. The epoxidation was conducted by charging 1g of the polymer, 36.5g of 1-octene, 4.5g of t-butylhydroperoxide and 2.1g of nonane diluent to a 100 ml glass reactor and maintaining the reaction mixture under reflux (90°–101°C) or 3.5 hours. The titanium content of the reaction mixture was 0.02%w. An 83.7% conversion of hydroperoxide and a 99.4% selectivity to 1-octene oxide based on converted hydroperoxide were obtained.

ILLUSTRATIVE EMBODIMENT 7

The epoxidation of 1-octene with t-butyl hydroperoxide was conducted with the polyorganotitanosiloxane polymer prepared in Illustrative Embodiment 2 as catalyst. The epoxidation was conducted by charging 1g of the polymer, 36.5g of 1-octene, 4.5g of t-butyl hydroperoxide and 2.1g of nonane diluent to a 100 ml glass reactor and maintaining the reaction mixture under reflux (about 108°C) for 40 minutes. The titanium content of the reaction mixture was 0.1%w. An 87.4% conversion of hydroperoxide and an 81.8% selectivity to 1 octene oxide based on converted hydroperoxide were obtained.

ILLUSTRATIVE EMBODIMENT 8

In order to further increase the molecular weight of the catalytic polymer, a catalyst prepared as desired in Illustrative Embodiment 1 was heated for 2 ½ hours at 200°C. The resulting product was more viscous than the polymer prior to heating. It was partly cross-linked and the molecular weight was therefore not determined.

Analysis: 42.8%wC; 6.0%wH; 29.2%wSi; 1.3%wTi; and 20.7%wO (by diff.)

ILLUSTRATIVE EMBODIMENT 9

The epoxidation process of Illustrative Embodiment 6 was repeated with the catalyst of Embodiment 8, employing 1.0g of the catalytic polymer, 36.5g of 1-octene, 4.5g of t-butyl hydroperoxide and 2.1g of nonane. The reaction was conducted at reflux (106°–110°C) for 1 1/4 hours. The titanium content of the reaction mixture was 0.014%w. An 80.5% conversion of hydroperoxide and a 95.7% selectivity to 1-octene oxide based on converted hydroperoxide were obtained.

The novel epoxidation process of the present invention was developed in the course of a larger study in which a variety of potential epoxidation catalysts were investigated. The objective of this study was to develop commercially useful epoxidation processes. Probably the most commercially useful single epoxide producible by such processes is propylene oxide. Another olefinic substrate which can be converted to a useful commercial product is allyl chloride, which is convertible to epichlorohydrin.

For convenience of laboratory investigation, 1-octene was chosen as reactant for studying novel catalysts because it is more conveniently handled and its conversion presents fewer analytical problems. In the course of the study, it was found that the epoxidation results — as represented by conversion of hydroperoxide and selectivity to olefine oxide of the converted hydroperoxide — which are obtainable in the epoxidation of 1-octene by are closely representative of the conversions and selectivities obtainable when utilizing identical catalysts in the epoxidation of propylene with the same hydroperoxides and at conditions appropriate for propylene epoxidation. Conditions for olefin epoxidation with soluble epoxidation catalysts are known. They are described, for example, in U.S. Pat. No. 3,351,635 to Kollar.

The following embodiments are illustrative of application of the present invention to the production of propylene oxide.

ILLUSTRATIVE EMBODIMENT 10

The epoxidation of propylene with ethylbenzene hydroperoxide is conducted with the polyorganotitanosiloxane polymer prepared in Illustrative Embodiment 1 as catalyst. The epoxidation is conducted by charging 1g of the polymer, 10.5g of propylene and 15 cc of ethylbenzene hydroperoxide (35%w in ethylbenzene) to 100 ml stirred autoclave, heating the reaction mixture to a temperature in the range from about 100° to 120°C, e.g., about 110°C, at autogenic pressure and continuing the reaction until at least about 50% of the ethylbenzene hydroperoxide has been converted. A typical reaction time would be in the range from 1 to 3 hours. A conversion of ethylbenzene hydroperoxide in the range from 80 to 100% with a selectivity to propylene oxide in the range from 80 to over 99% should be obtained.

ILLUSTRATIVE EMBODIMENT 11

By conducting the propylene conversion of Illustrative Embodiment 9 with t-butyl hydroperoxide substituted for ethylbenzene hydroperoxide, substantially the same hydroperoxide conversion and selectivity to propylene will be obtained.

ILLUSTRATIVE EMBODIMENT 12

By substituting in Illustrative Embodiments 10 and 11 the polyorganotitanosiloxane catalyst of Illustrative Embodiment 2, conversion of propylene to propylene oxide will take place with a somewhat lower selectivity than is obtained in Embodiments 10 and 11; a selectivity in the range from 75 to 90% should be obtained.

Other methods of conducting the epoxidation of propylene, as well as of other olefinically unsaturated substrates suitable for epoxidation by the process of this invention, will be readily apparent to the person skilled in the epoxidation art.

We claim as our invention:

1. A process for epoxidizing an olefinically unsaturated hydrocarbon of from 3 to 30 carbon atoms with a hydrocarbon hydroperoxide of from 3 to 20 carbon atoms by contacting a mixture thereof in liquid phase in inert solvent at a temperature of about 25°C to 200°C and a pressure in the range from 1 to 100 atmospheres, sufficient to maintain the mixture in liquid phase, with a polyorganotitanosiloxane polymer produced by hydrolysis in aqueous alkaline solution of (1) an alkyl ester of orthotitanic acid and (2) one or more silanes represented by formula (R')$_n$Si (X)$_m$ wherein R' is an alkyl group of 1 to 6 carbon atoms or an aryl group of 6 to 10 carbon atoms, X is chlorine, bromine, phenoxy or alkoxy of 1 to 6 carbon atoms; $n$ is 1 to 2, $m$ is 2 to 3, the sum of +$m$ is 4, and the molar ratio of said silane to orthotitanic acid ester is from 15:1 to 1:1.

2. The process of claim 1 wherein the hydrocarbon hydroperoxide is a tertiary alkyl hydroperoxide.

3. The process of claim 2 wherein said component (2) is a mixture of silanes and X is chlorine or bromine.

4. The process of claim 3 wherein the mixture of silanes is dimethyldichlorosilane and phenyltrichlorosilane and the orthotitanic acid ester is tetrabutoxytitanate.

5. The process of claim 2 wherein the olefinically unsaturated compound is propylene and the hydroperoxide is t-butyl hydroperoxide.

6. The process of claim 2 wherein the olefinically unsaturated compound is 1-octene and the hydroperoxide is t-butyl hydroperoxide.

7. The process of claim 1 wherein the hydrocarbon hydroperoxide is an aralkyl hydroperoxide wherein the hydroperoxy group is on a carbon atom adjacent to an aromatic ring.

8. The process of claim 7 wherein said component (2) is a mixture of silanes and X is chlorine or bromine.

9. The process of claim 8 wherein the mixture of silanes is dimethyldichlorosilane and phenyltrichlorosilane and the orthotitanic acid ester is tetrabutoxytitanate.

10. The process of claim 7 wherein the olefinically unsaturated compound is propylene and the hydroperoxide is ethylbenzene hydroperoxide.

11. The process of claim 7 wherein the olefinically unsaturated compound is 1-octene and the hydroperoxide is ethylbenzene hydroperoxide.

12. The process of claim 1 wherein the hydrolysis is conducted in the additional presence of an inert organic co-solvent.

13. A process for epoxidizing propylene with t-butyl hydroperoxide or ethyl benzene hydroperoxide by contacting a mixture thereof in liquid phase in inert solvent at a temperature of about 25°C to 200°C and a pressure in the range from 1 to 100 atmospheres, sufficient to maintain the mixture in liquid phase, with a polyorganotitanosiloxane polymer produced by hydrolysis in aqueous alkaline solution of (1) an alkyl ester of orthotitanic acid and (2) a silane represented by formula $(R')_n Si (X)_m$ wherein $R'$ is an alkyl group of 1 to 6 carbon atoms or an aryl group of 6 to 10 carbon atoms, X is chlorine, bromine, phenoxy or alkoxy of 1 to 6 carbon atoms, $n$ is 1 to 2, $m$ is 2 to 3, the sum of $n+m$ is 4, and the molar ratio of said silane to orthotitanic acid ester is from 15:1 to 1:1.

14. A process for epoxidizing 1-octene with t-butyl hydroperoxide or ethyl benzene hydroperoxide by contacting a mixture thereof in liquid phase in inert solvent at a temperature of about 25°C to 200°C and a pressure in the range from 1 to 100 atmospheres, sufficient to maintain the mixture in liquid phase, with a polyorganotitanosiloxane polymer produced by hydrolysis in aqueous alkaline solution of (1) an alkyl ester of orthotitanic acid and (2) a silane represented by formula $(R')_n Si (X)_m$ wherein $R'$ is an alkyl group of 1 to 6 carbon atoms or an aryl group of 6 to 10 carbon atoms, X is chlorine, bromine, phenoxy or alkoxy of 1 to 6 carbon atoms, $n$ is 1 to 2, $m$ is 2 to 3, the sum of $n+m$ is 4, and the molar ratio of said silane to orthotitanic acid ester is from 15:1 to 1:1.

* * * * *